United States Patent
Snow et al.

(10) Patent No.: US 9,003,961 B2
(45) Date of Patent: Apr. 14, 2015

(54) SELF ADJUSTING ROTISSERIE DEVICE

(71) Applicants: Peter T Snow, Macungie, PA (US);
Julius K Rocco, Harleysville, PA (US)

(72) Inventors: Peter T Snow, Macungie, PA (US);
Julius K Rocco, Harleysville, PA (US)

( * ) Notice: Subject to any disclaimer, the term of this patent is extended or adjusted under 35 U.S.C. 154(b) by 50 days.

(21) Appl. No.: 13/682,879

(22) Filed: Nov. 21, 2012

(65) Prior Publication Data
US 2014/0141144 A1    May 22, 2014

(51) Int. Cl.
A47J 37/06    (2006.01)
A47J 37/07    (2006.01)
A47J 37/04    (2006.01)

(52) U.S. Cl.
CPC ..................... *A47J 37/041* (2013.01)

(58) Field of Classification Search
CPC ... A47J 37/041; A47J 37/0763; A47J 37/067; A47J 33/00; A47J 2037/0795; A47J 37/0772; A47J 37/0745; F24B 1/205; F24B 1/182; F24B 1/202
USPC ......... 99/421 H, 421 HH, 419, 421 R, 421 A, 99/421 HV, 421 M, 421 V; 126/3, 25 A, 126/25 AA, 9 R, 30; 426/523
See application file for complete search history.

(56) References Cited

U.S. PATENT DOCUMENTS

| | | | |
|---|---|---|---|
| 2,486,345 A | 10/1949 | Triulzi | |
| 2,849,948 A | 9/1958 | Rowley | |
| 2,887,944 A | 5/1959 | Walker | |
| 3,339,479 A | 9/1967 | Miller et al. | |
| 3,344,736 A | 10/1967 | Myler et al. | |
| 3,359,888 A | 12/1967 | Deege et al. | |
| 3,742,839 A | 7/1973 | Maley | |
| 3,901,136 A * | 8/1975 | Wilson et al. | 99/421 P |
| 4,043,260 A | 8/1977 | LaPour et al. | |
| D262,347 S | 12/1981 | Bourne et al. | |
| 4,436,024 A | 3/1984 | Arden et al. | |
| 4,892,032 A | 1/1990 | Jerome | |
| 5,287,844 A * | 2/1994 | Fieber | 126/30 |
| 5,819,639 A | 10/1998 | Spell | |
| 6,508,167 B1 * | 1/2003 | Lu | 99/421 H |
| 7,011,578 B1 * | 3/2006 | Core | 454/292 |
| 7,089,694 B2 * | 8/2006 | Allen | 40/607.04 |
| 7,377,211 B1 * | 5/2008 | Savage et al. | 99/571 |
| 7,874,531 B1 * | 1/2011 | Walden | 248/176.1 |
| 2007/0137498 A1 | 6/2007 | Sarich | |
| 2011/0175293 A1 * | 7/2011 | Brune | 273/406 |

* cited by examiner

*Primary Examiner* — Henry Yuen
*Assistant Examiner* — Hung D Nguyen
(74) *Attorney, Agent, or Firm* — Cusick IP, PLLC; Clinton J. Cusick, Esq.

(57) ABSTRACT

A self adjusting rotisserie device utilizing multiple positions to achieve leveling on uneven surfaces and automatic alignment on each end of a spit through the use of rotational standards and rotational attachment of a hanging motor housing and a hanging bearing housing, each fixedly attached to rods and removably attached to two standards, and each removably attached to a base; a method of cooking food utilizing a self adjusting rotisserie.

9 Claims, 10 Drawing Sheets

US 9,003,961 B2

SELF ADJUSTING ROTISSERIE DEVICE

FIELD OF THE INVENTION

The present inventive concept provides an improved spit for cooking food over a heat source, and a method for using an improved spit to cook food over a heat source. The improved device can be capable of leveling as well as auto aligning the spit between two rods independent of the ground surface. Additionally, the device provides easy installation and removal of the food from the heat source operable by a single person.

BACKGROUND

The present device relates to an improved spit and method of using the improved spit to cook food over an open heat source. Rotisserie style cooking is utilized to cook meat adjacent an open heat source. In rotisserie cooking, the meat is often skewered on a spit, or long rod. The spit and meat are then placed by an open heat source, and rotated about the longitudinal axis of the spit. The rotation allows the heat to evenly cook the item and for the juices to flow about the meat, providing a mechanism for self-basting. Rotisserie cooking is generally used to cook large pieces of meat and whole animals, such as pigs, turkeys, goats, and chickens.

The use of horizontally held spits is common. In this arrangement, the spit is held horizontally over a heat source and usually an automatic mechanism is used to rotate the spit at one end. Balance is very important for horizontal spits because excessive weight out of balance may cause the rotation mechanism to break and stop rotating. Failure to rotate would lead the meat to be burnt on one side and undercooked on the other. Additionally, if the spit is not held substantially level, the meat may be pulled by gravity and slide to one end of the rod, which could again prevent the rotation mechanism from working, or may potentially cause the entire structure to fall over, ruining the food. Therefore, great care must be taken to ensure that the spit stays substantially level during the cooking process, which takes extra time and effort on the part of the person setting up the device.

A well-known method of rotisserie-style cooking is by using a rod, commonly referred to as a spit that is held horizontally over the heat source by two standards located on opposite sides of the heat source. The article of food to be cooked is skewered onto the spit and held over the heat source by placing the spit ends onto the standards. The spit can then be rotated either by manual methods, or by a mechanical device. As the spit is rotated about its longitudinal axis, each surface of the article of food is exposed to the heat evenly. Additionally, any juices that are released from, or coated onto, the food are evenly spread about the surface. After the food is thoroughly cooked, the spit and the food are removed from the standards and heat source and prepared for serving.

When large pieces of meat are placed on the spit, it becomes very heavy and awkward to handle. Two people are often required to secure the spit above the heat source due to the weight. Therefore, if the posts are not properly aligned, the people securing the spit may be frustrated at the need to realign the posts, which may be difficult or impossible to accomplish without placing the spit down. This readjustment requires additional time and potential frustration if alignment is not possible due to the ground surface.

Often times, the piece of meat or entire animal being cooked is large, heavy and too bulky for a single person to handle easily, which presents a potentially dangerous situation when an open flame or other heat source is involved. Additionally, after the food is fully cooked, it must be removed from the heat source prior to carving and serving. Due to the weight and size of the food, a single person cannot remove the spit from the heat source without additional help. One person is required to hold each end of the spit, so that it is held level as it is being moved to a table for carving. The requirement of two people may be inconvenient, or not possible in all situations. In conventional arrangements, uneven ground may present difficulty in aligning the posts to be vertical, in facing two posts towards each other, establishing a horizontal spit, or connecting each end of the spit to a post at an even height.

Therefore, based on the drawbacks often experienced with rotisserie cooking using a spit, what is needed is an improved spit device that is capable of being substantially leveled easily and can self-align the spit between two posts without regard to the placement of the posts. Also needed is a spit that is capable of holding large objects that can be removed from the heat source by a single person.

SUMMARY OF THE INVENTION

It is an aspect of the present method and apparatus for cooking food over a heat source that is easy to operate and reduces the number and skill level of the users required for cooking and serving a large piece of food.

The above aspect can be obtained by an improved spit device comprising a first base with adjustable feet to level the base, and an offset post oriented vertically. The feet can be adjusted to establish a level base and a substantially vertical post. A first standard is placed on the base via the post and rotates freely about the post. The standard comprises several rod holes at various heights. A standard is suited to receive a hanging motor housing, comprises a cylindrical motor rod, and is secured to the standard by inserting the motor rod into an appropriate rod hole in the first standard and inserting a retaining pin into the motor rod via a motor rod hole.

The hanging motor housing and motor rod can turn within the rod hole to orient the front of the hanging motor housing in any vertical direction. The first standard can rotate about the post to orient in any horizontal direction. The combination allows the front of hanging motor housing to face any direction. A second base, post, and standard are positioned opposite a heat source and a hanging bearing housing comprising a plate rod, a hanging plate, and a bearing mount is connected to the second standard by inserting the plate rod into a rod hole and securing with a retaining pin. Hanging motor housing and hanging bearing housing both comprise a bearing mount facing the opposing standard. Thus a spit can be mounted between the first and second standards over a heat source. The bases can be adjusted for uneven ground via the adjustable feet. The spit can be leveled despite differences in elevation by selecting appropriate rod holes on each standard. Further self alignment of the two bearing mounts is achieved by rotation of each standard about the post and rotation of each bearing mount about the motor rod or plate rod within a rod hole on the respective standards. In this manner, the device achieves a level base on an uneven surface, accommodates different surface elevations on either side of the heat source through selection of a rod hole, and automatically orients to accept both sides of a spit into a bearing mount. The hanging motor housing further comprises a motor to turn the spit. The spit is secured in each bearing mount with a set screw.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

Figure 1A:
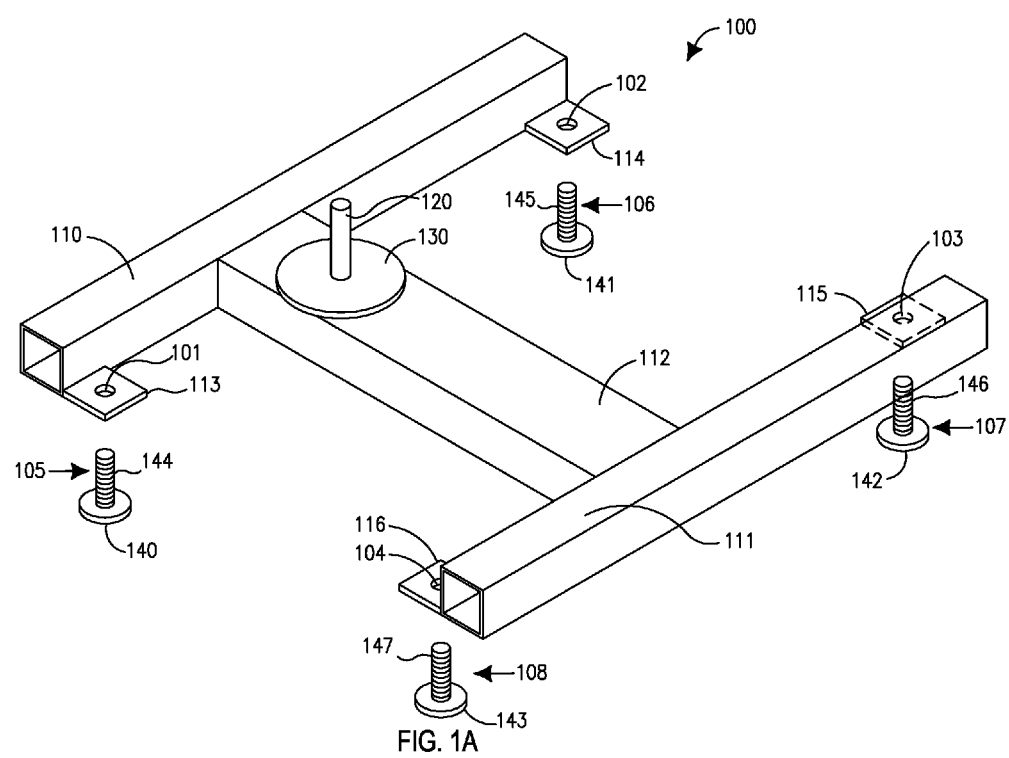
FIG. 1A is a perspective view of the base of the invention according to an embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the embodiments of the invention, examples of which are illustrated in the accompanying drawings, wherein like reference numerals refer to like elements throughout. It is well known in the art to cook items, particularly meats rotisserie style over an open heat source, such as a fire. A spit held by two standards is often used for this purpose. The inventive concept relates to an improved device and method for cooking foods over heat source rotisserie style that uses self-adjustable standards, a hanging motor housing, and a hanging bearing housing for holding and rotating the spit over the heat source.

The inventive concept uses self-adjusting standards that are capable of rotating about a vertical axis substantially perpendicular to their base and holding a spit end at numerous positions in relation to the ground. The ability for the standards to be capable of these adjustments allows them to be installed on uneven terrain, and do not require perfect alignment prior to use. This feature saves the user time and effort in setting up the system for use. Additionally, if either or both of the standards move during use, the adjustment ability provides compensation, adapting to the orientation of the spit, without the entire system failing. Another significant benefit provided by this invention is that one person is able to remove the item from the heat source. The rotation of the standard about its base, allows a person to grasp a single end of the spit, with the other end connected to and supported by one standard and rotate the food to any angle to a location that is not producing heat. A table can be located at this location and the food item can be placed on the table and prepared for serving.

The present inventive concept provides a method and device for cooking foods over an open heat source and can comprise two bases, two standards, a hanging motor housing, a hanging bearing housing and a spit. FIG. 1A shows an embodiment of a base 100. The base 100 can be configured in an H shape having two legs 110 and 111 and a cross beam 112. Each leg 110 and 111 can comprise two base flanges 113, 114, 115, and 116, which can extend toward the other leg 110 or 111 as they are less likely to cause tripping if positioned interior to the base, but could be positioned on the outward side of the base 100. Each base flange 113, 114, 115, and 116 can comprise a threaded opening 101, 102, 103, and 104. A foot 105, 106, 107 and 108 can be threadedly inserted into each threaded opening 101, 102, 103, and 104. The foot 105, 106, 107 and 108 can comprise a rounded pad 140, 141, 142 and 143 and a threaded post 144, 145, 146 and 147. The threaded post 144, 145, 146 and 147 can be inserted and threaded into the threaded opening 101, 102, 103, and 104 to any depth to allow the height of each leg 110 and 111 to be adjustable at either end, to provide secure placement of the base 100 on the ground. The adjustment of each foot is utilized to accommodate uneven terrain under base 100 so that post 120 is substantially vertical. When base 100 is placed on suitable surface such as even, level soil, threaded opening 101, 102, 103 or 104 can be used to receive a stake or spike to secure base 100. Other means to steady or secure the base can also be utilized including sand bags, bricks, or other means of fastening or stabilizing the base 100.

The cross beam 112 can comprise a post 120. The post 120 can be used to hold a standard (not shown) in an upright position relative to the base 100. The post 120 can project in a direction perpendicular to the cross beam 112. The post 120 should be cylindrical in shape, so that the standard (not shown) can freely rotate about it. The post 120 can be located off center of the cross beam 112 for optimal balancing purposes. Post 120 can be offset from the center of cross beam 112 so that the hanging motor housing (not shown) sits approximately central to the center of mass of base 100. In this way, the mass of a food item (not shown) will be centered over the center of mass of base 100 to achieve stability. Disk 130 is located about post 120 and provides ease of rotation for standard 200 (not shown). The post 120 and the base 100 can be made from metal pieces that are welded into this shape, but any material and base shape capable of holding the standard (not shown) in an upright position during operation is contemplated.

Figure 1B:
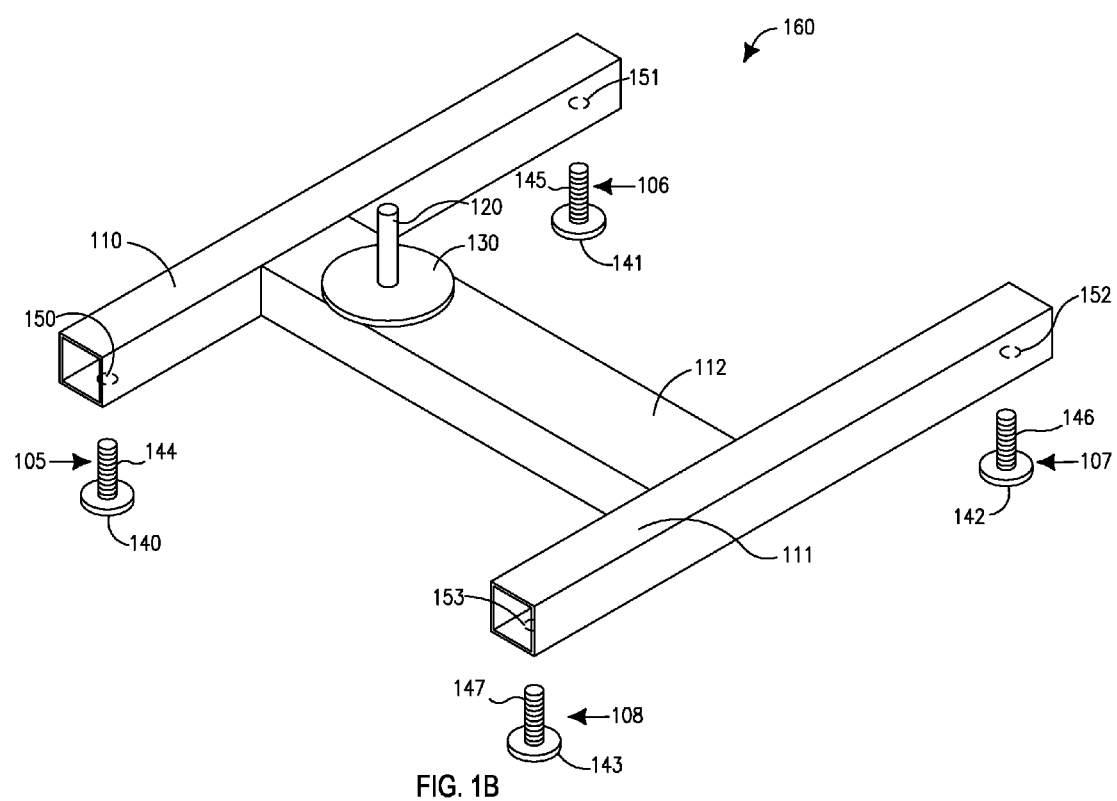
FIG. 1B is a perspective view of the base of the invention according to another embodiment.

FIG. 1B shows a streamlined version of base 160 where feet 105, 106, 107, and 108 are removably attached directly to legs 110 and 111. Foot 105 can be secured through threaded hole 150 and like components can be similarly secured and adjusted 106 to 151, 107 to 152, and 108 to 153.

Figure 2:
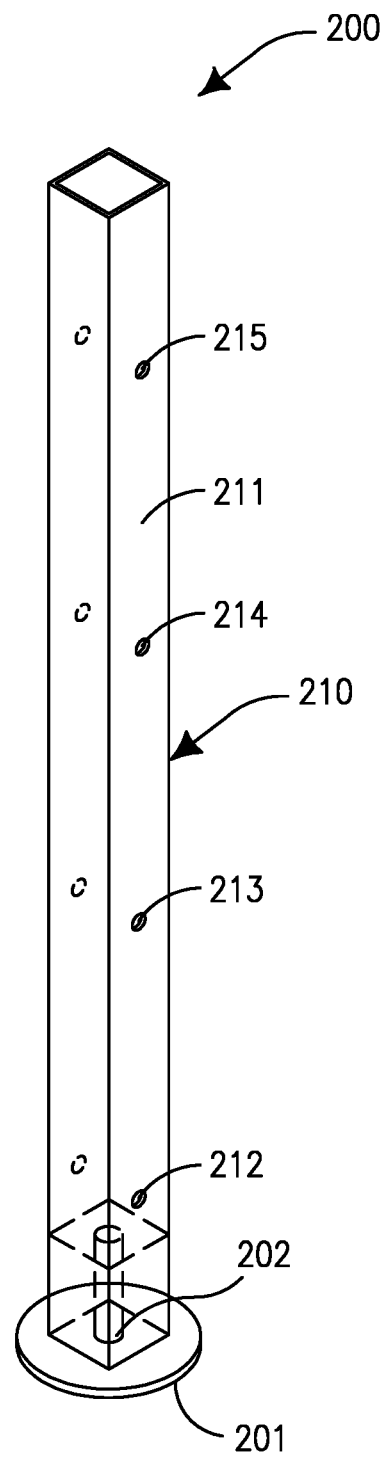
FIG. 2 is a perspective view of a standard of the invention according to an embodiment.

FIG. 2 shows an embodiment of a standard 200. The device utilizes two standards that can be identical and interchangeable. First standard 200 is described here, and this description also describes a second standard 801 (not shown). First standard 200 can comprise a bottom 201 and a shaft 210. The bottom 201 can comprise a post hole 202, which can be round and can be sized to accept the post 120 (not shown) of the base 100 (not shown). The bottom 201 can be sized to interface with disk 130 (not shown) located in the base 100 (not shown) to facilitate rotation of the standard 200 about the post 120 (not shown). Post 120 (not shown) defines an axis of rotation for the first standard that is substantially vertical. First standard 200 is centered by post hole 202. Round post hole 202 and round post 120 (not shown) allow for smooth rotation of the first standard 200 upon base 100 (not shown). First standard 200 is rotatable upon base 100 (not shown) about a substantially vertical axis or rotation. In this way, standard 200 can be rotatably mounted or, alternately described, rotatably seated, on base 100 (not shown).

The shaft 210 can be connected to the rounded bottom 201 by welding the two metal pieces together with the post hole 202 located so that the post 120 (not shown) will extend up the center of the shaft 210. The shaft can have a square cross section, which will create a flat surface 211 on at least one side, however a shaft with a round cross section such as a pipe will also function within the scope of the invention. A first rod hole 212 in flat surface 211 can be located a distance up the shaft 210 away from the rounded bottom 201. This distance can be twelve inches, but can also be any distance reasonable for holding a food item over a heat source. Additional rod holes 213, 214 and 215 can be located along the shaft 210 at set distances. The number of additional rod holes 213, 214 and 215 can be altered depending on the length of a given shaft 210, with the convenient shaft length being about 50 inches. The rod holes 212, 213, 214 and 215 can be circular and pass entirely through shaft 210 in an embodiment of the invention. Rod holes 212, 213, 214, or 215 each define an axis of rotation for a rod (not shown) inserted into the rod hole. A cylindrical rod may rotate within a circular rod hole on an axis defined by the rode hole, for example rod hole 212, or any other rod hole. The axis of rotation defined by a rod (not shown), and the axis of rotation defined by a rod hole coincide, and reference to an axis of rotation defined by a rod (not shown) will, as a matter of geometry, be interchangeable with an axis of rotation defined by a rod hole into which the rod is inserted. A second standard (not shown) constructed as shown in FIG. 2 will have the same properties as in the description above.

Figure 3A:
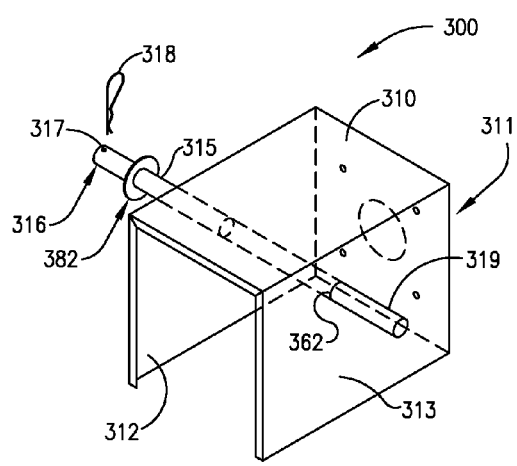
FIG. 3A is a perspective view of a motor box according to an embodiment.

FIG. 3A shows an embodiment of a hanging motor housing 300. The hanging motor housing 300 can comprise a top 310, a front side 311, a first side 312 and a second side 313. The top 310 can be a solid piece of metal, or other material, used to protect the motor. The hanging motor housing 300 can be constructed of metal and comprises top 310, first side 312, second side 313 and front 311 fixedly attached by welding. Additionally, portions of the housing can be formed by folding metal to create some of the elements, or a combination of folding and welding, or other methods. Hanging motor housing 300 is fixedly attached to motor rod 315 by means including welding. Motor rod 315 extends into the hanging motor housing 300 and is fixedly attached to second side 313. Motor rod 315 extends past second side 313 as motor rod second end 319. Motor rod first end 316 contains motor rod hole 317 suited to receive motor locking pin 318 for securing hanging motor housing to a standard (not shown). Motor rod collar 382 is positioned proximate motor rod first end 316 and spaced apart a distance greater than diameter of shaft 210 (not shown), conveniently about four inches. The distance between motor locking pin 318 and motor rod collar 382 allows 318 on one side and 382 on the other side to secure hanging motor housing to first standard 200 (not shown). Motor rod second end 319 can be fixedly attached through conventional means including welding to second side 313 and passing through second side hole 362. Hanging motor housing 300 is configured to enable rotation about motor rod 315 and about an axis that is defined by motor rod 315. This axis of rotation is substantially horizontal in the assembled device. When motor rod 315 is inserted into a rod hole (not shown) on standard 200 (not shown), the axis of rotation is also defined by the rod hole (not shown) which guides, positions, and holds motor rod 315.

Figure 3B:
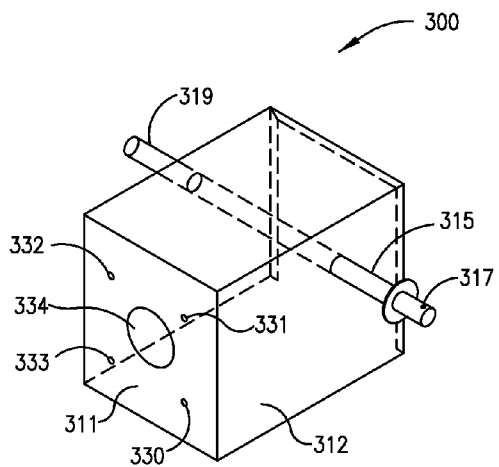
FIG. 3B is an additional perspective view of a motor box according to an embodiment.

FIG. 3B shows an alternate perspective of FIG. 3A showing the other side of the hanging motor housing 300. Front side 311 is shown comprising motor spit hole 334. Front side 311 can comprise four housing fastener holes 330, 331, 332 and 333 for securing a motor bearing mount (not shown). The motor spit hole 334 can be located in the center of the front side 311. The motor spit hole 334 can be circular and can have a diameter sufficient to clear the spit (not shown).

Figure 3C:
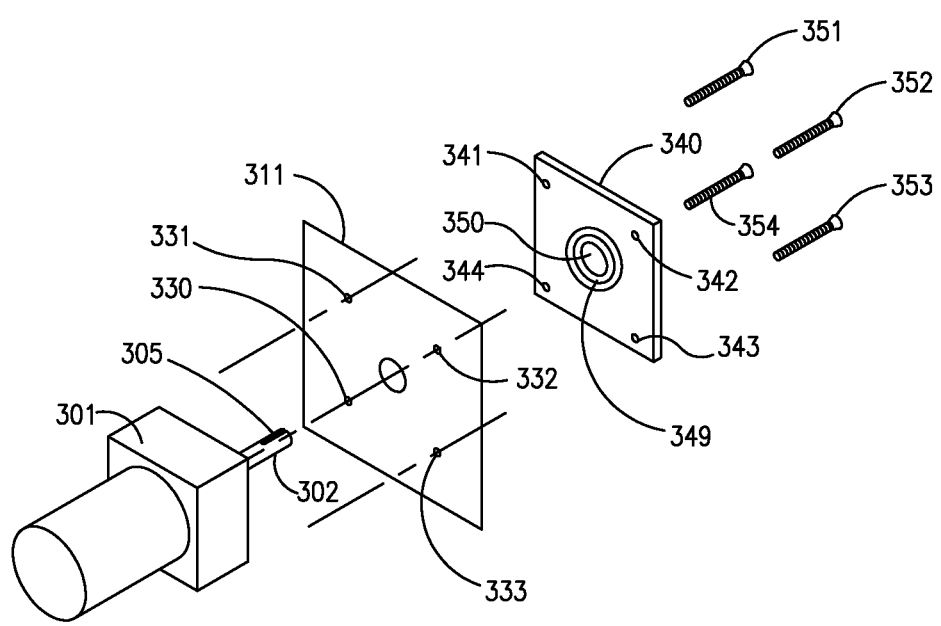
FIG. 3C is a perspective view of a motor according to an embodiment.

FIG. 3C is an exploded view showing the connection of the motor 301, the front side 311, and motor bearing mount 340. Other elements of the hanging motor housing are not present in this view for clarity of the elements shown. The motor bearing mount 340 can be obtained commercially from suppliers such as, but not limited to, McMaster-Carr (viewable at www.mcmaster.com). One suitable choice is food-grade stainless steel mounted ball bearings—part number ABEC-1. This part is also called a square-flange mount and includes shielded ball bearings that are lubricated and sealed so that food does not contact the moving parts including the bearings. As used in the present invention, motor bearing mount 340 comprises a motor bearing 349 that further comprises a motor bearing opening 350. Motor bearing 349 can rotate freely within motor bearing mount 340. Motor bearing mount 340 can also comprise four bearing fastener holes 341, 342, 343, and 344 for attaching the motor bearing mount 340 to the front side 311. Motor bearing mount 340 can be secured to the front side 311 by using four properly sized housing screws, 351, 352, 353, 354. Motor bearing opening 350 can be round. Motor drive shaft 302 is keyed to accept a spit, not shown. Motor drive shaft 302 can have at least one recessed portion to prevent slippage between the motor drive shaft 302 and spit (not shown). Keyed motor shafts are well known and can be found in a variety of sizes in supply catalogs such as Grainger Industrial Supply (viewable at www.grainger.com). Motor drive shaft 302 is shown with recessed key 305. In an embodiment, standard motor 301 can be secured to front side 311 of hanging motor housing 300 by housing fasteners 351, 352, 353, and 354. Motor drive shaft 302 is oriented towards motor bearing opening 350. Motor bearing mount 340 comprises a threaded opening and a set screw (not shown) that can be tightened to secure a spit (not shown). A set screw can be a conventional threaded device such as a machine screw that can be rotated to move the screw towards motor bearing opening 350 and engage a spit (not shown). When the set screw is tightened, it compresses the spit (not shown) against the motor bearing 349 and joins the rotational movement of the spit (not shown) and ensures that the motor bearing 349, motor drive shaft 302, and spit (not shown) rotate together. Motor drive shaft 302 should be centered and accessible through motor bearing opening 350.

Figure 3D:
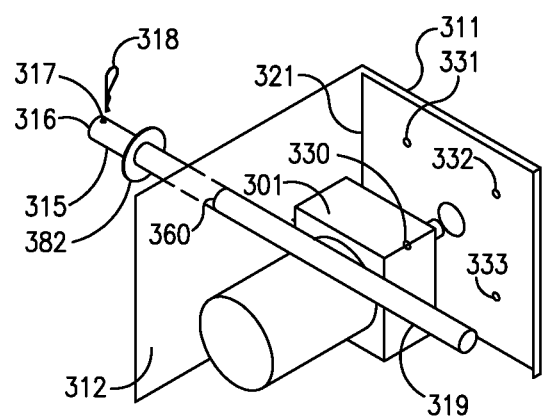
FIG. 3D is a partial perspective view of the interior of a hanging motor housing according to an embodiment.

FIG. 3D shows another perspective view of the hanging motor housing with some elements removed for clarity. Motor rod 315 can be of a size and material sufficiently substantial to hold the weight of a standard motor 301, spit (not shown) and food (not shown) safely. A suitable size of the motor rod 315 is approximately one inch in diameter made from metal, including stainless steel. Motor rod first end 316 can comprise motor rod hole 317 capable of accepting a motor locking pin 318. The motor locking pin 318 can be inserted into the small motor rod hole 317 after the motor rod 315 has been inserted though a rod hole of the shaft of FIG. 2. Motor rod 315 passes through first side 312 through first side hole 360. Motor rod 315 can be fixedly attached to 312 through conventional means including welding. Motor rod 315 extends over the motor 301 and terminates at motor rod second end 319. Motor rod second end 319 also provides a hand grip and serves as a handle for lifting the hanging motor housing and whatever other elements of the invention are attached, which in aggregate can be heavy.

Figure 4:
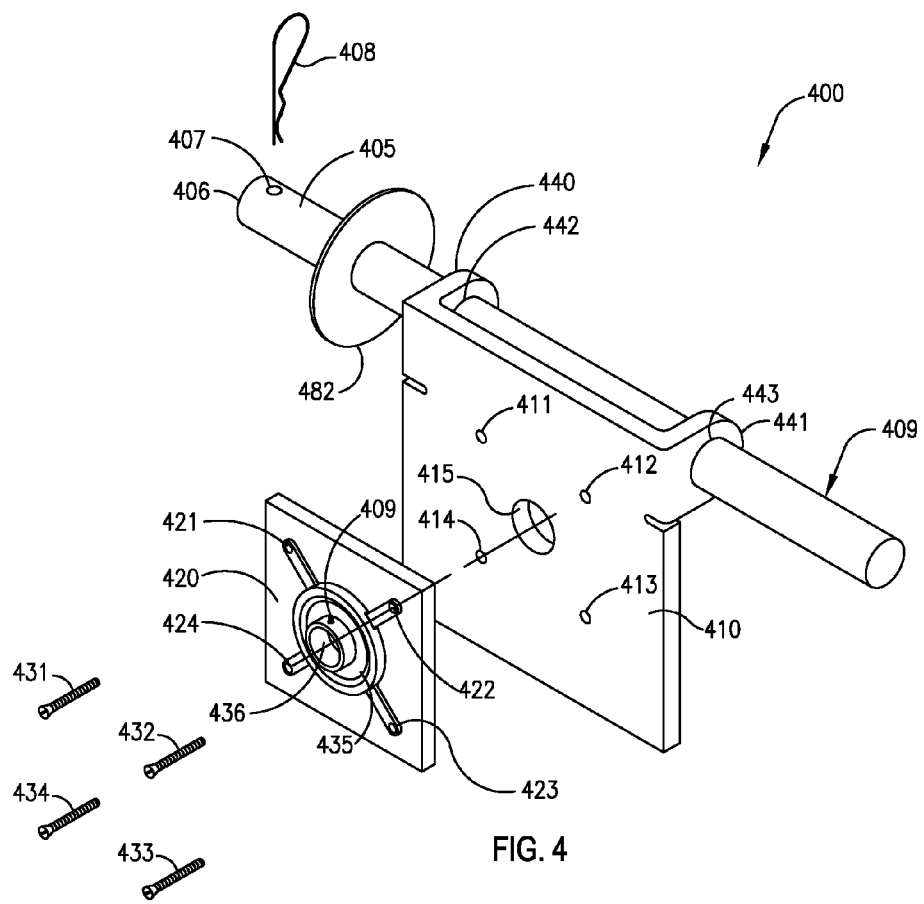
FIG. 4 is a partially exploded view of a hanging bearing housing according to an embodiment.

FIG. 4 shows an exploded view of an embodiment of a hanging bearing housing 400. The hanging bearing housing 400 can comprise a plate rod 405 and a hanging plate 410. The hanging plate 410 can comprise four plate fastener holes 411, 412, 413, and 414 for securing a plate bearing mount 420. A plate spit hole 415 can be located in the center of the hanging plate 410. Plate spit hole 415 can be circular and can have a diameter sufficient to clear the spit (not shown). The plate bearing mount 420 can also comprise four bearing fastener holes 421, 422, 423, and 424 for attaching it to the hanging plate 410 of the hanging bearing housing 400. Plate bearing mount 420 can be secured to the hanging plate 410 by using four properly sized fasteners 431, 432, 433, and 434. Plate bearing mount 420 can also comprise a plate bearing 435 with a plate bearing opening 436 that is also round to accept the round end of the spit (not shown.) Plate bearing 435 can allow the spit to easily rotate. Plate bearing mount 420 is commercially available and can be the same as motor bearing mount 340 (not shown). Plate bearing mount 420 provides rotation of plate bearing 435 while also providing rigid support through attachment to hanging plate 410.

The hanging plate 410 can also comprise two flanges 440 and 441 located at one end. The two flanges 440 and 441 can be oriented perpendicular to the hanging plate 410 surface and each flange 440 and 441 can comprise a flange hole 442 and 443. Plate rod 405 can be inserted through both flange holes 442 and 443 and fixedly secured to flanges 440 and 441 and thereby to hanging plate 410 through means including welding. The plate rod 405 can be a size and material sufficiently substantial to hold the weight of the spit (not shown) and food (not shown) safely. The size of the plate rod 405 can be approximately one inch in diameter made from metal, including stainless steel, although other structural materials can be utilized to achieve the same results. Plate rod first end 406 can comprise a plate rod hole 407 capable of accepting a plate locking pin 408. Plate bearing mount 420 comprises a set screw 409 positioned within a threaded opening (not shown). Set screw 409 can be a conventional threaded device such as a machine screw that can be rotated to move the screw towards plate bearing opening 436 and engage a spit (not shown). When the set screw is tightened, it compresses the spit (not shown) against plate bearing 435 and joins the rotational movement of the spit (not shown) and ensures that the plate bearing 435 and spit (not shown) rotate together.

Plate rod second end 409 can extend through flange hole 443 of hanging plate 410. Hanging bearing housing 400 is connected to a standard as shown in FIG. 2 by passing plate rod first end 406 through a rod hole (not shown). Plate rod collar 482 limits the travel of plate rod 405 into a rod hole (not shown). Plate locking pin 408 is then inserted in plate rod hole 407 to prevent removal of plate rod 405 from a second standard (not shown) and secure hanging bearing housing to a standard (not shown). Hanging bearing housing 400 is configured to enable rotation about plate rod 405 and about an axis that is defined by plate rod 405. This axis of rotation is substantially horizontal in the assembled device. When plate rod 405 is inserted into a rod hole (not shown) on standard 200 (not shown), the axis of rotation is also defined by the rod hole (not shown) which guides, positions, and holds plate rod 405.

Figures 5A, 5B:
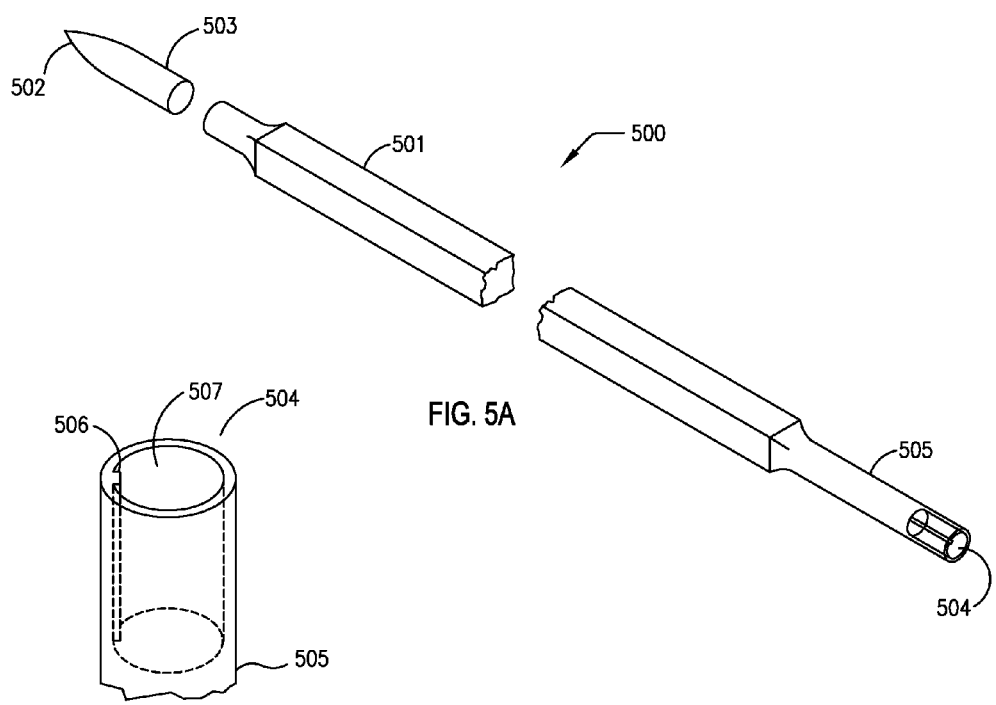
FIG. 5A is a perspective view of a spit according to an embodiment.
FIG. 5B is a close up view of the hollow end of a spit according to an embodiment.

FIG. 5A shows an embodiment of a spit 500. The spit 500 can be one long piece of metal that is approximately ten feet in length. The material and diameter should be sufficiently strong to remain straight even when the weight of the food and heat are applied. Any length of material would be acceptable, so long as it is sufficiently long to extend across the heat source being used. Spit 500 is configured with a pointed end 502 and a hollow end 504. Pointed end 502 effectively pierces the meat or food item to be cooked. First rounded section 503 is designed to intersect plate bearing 435 (not shown) and be positioned within plate spit hole 415 and plate bearing opening 436 as shown in FIG. 4. Second rounded section 505 is designed to pass through and intersect motor bearing opening 350 in FIG. 3C and motor spit hole 334 of FIG. 3B. The spit 500 can be configured with a square cross section 501 that reduces the chance of slippage of the food item (not shown) about the spit 500. First rounded section 503 will turn within plate bearing mount (not shown). Second rounded section 505 will turn within motor bearing housing (not shown). The spit 500 can be made of food grade stainless steel, but other rigid materials including metals and ceramics will function as part of the invention.

FIG. 5B shows a close up of hollow end 504. Interior 507 is configured to fit over motor drive shaft 302 of FIG. 3C and recessed key 305 of FIG. 3C. Spit key 506 is generally rectangular and protrudes within the length of interior 507. Spit key 506 prevents slippage of spit 500 when connected to motor 301 of FIG. 3C by way of motor drive shaft 302 (not shown). Spit key 506 is disposed in hollow interior 507 and designed to mate with motor drive shaft 302 (not shown) and the slot of recessed key 305 (not shown) to prevent rotational slippage.

Figure 6:
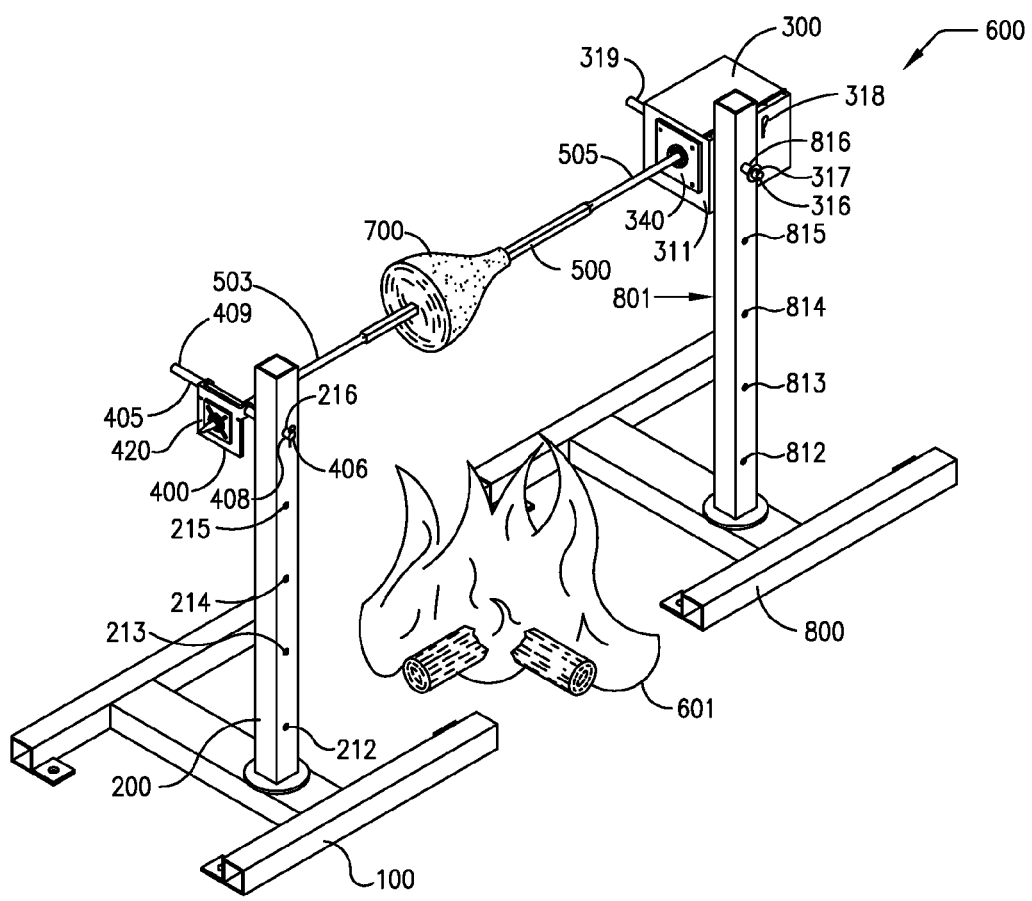
FIG. 6 is a perspective view of a method of utilizing an embodiment of the invention.

FIG. 6 shows an embodiment of a self-adjusting spit device 600 as assembled in the cooking configuration. Assembly of the spit device 600 can be accomplished by placing a first base 100 and a second base 800 on the ground on opposite sides of a heat source 601. Base 800 is contemplated as identical to first base 100 of Figure 1A and interchangeable with similar components. First standard 200 can be placed on first base 100 so that the post 120 (not shown) extends into the post hole 202 (not shown) to configure first standard 200 to enable rotation about a substantially vertical axis. In this way first standard 200 is rotatably seated on first base 100. When first base 100 is substantially level and substantially horizontal, first standard 200 is configured to be substantially vertical. Rotation of first standard 200 upon base 100 moves about a substantially vertical axis. Second standard 801 is contemplated as identical and interchangeable with first standard 200 of FIG. 2. Second standard 801 can be placed on base 800 so that the post (not shown) extends into the post hole (not shown). Second standard 801 is rotatably seated upon second base 800 in the same manner as first standard 200 is rotatable upon first base 100. Second standard 801 rotates upon said second base 800 and rotational movement occurs about a substantially vertical axis defined by a post (not shown) similar to post 120 (not shown). The motor rod first end 316 can be inserted through a rod hole 812, 813, 814, 815, or 816 on second standard 801. Hanging motor housing 300 is configured to enable rotation about an axis defined by motor rod 315. In this figure, motor locking pin 318 is inserted into the motor rod hole 317 after the motor rod first end 316 has been inserted though the rod hole 816 of second standard 801. The motor locking pin 318 prevents movement of the hanging motor housing 300 out of second standard 801, but allows for free rotation of the entirety of hanging motor housing 300 about the axis of the selected rod hole which coincides with the axis of motor rod 315. When assembled, hanging motor housing 300 is rotatable about a substantially horizontal axis. The horizontal axis of rotation is defined by motor rod 315, and hanging motor housing 300 is configured to enable rotation about motor rod 315 that defines a substantially horizontal axis of rotation.

The plate rod 405 can be inserted through a rod hole 212, 213, 214, 215, or 216 on first standard 200. The selected rod hole 212, 213, 214, 215, or 216 should be at a height most similar to the height of the rod hole 812, 813, 814, 815, or 816 comprising the hanging motor housing 300 to establish the most horizontal orientation of the spit 500. The plate locking pin 408 can be inserted into the plate rod first end 406 via plate rod hole 407 (not shown) after the plate rod 405 has been inserted though the rod hole 216 of first standard 200 as shown. The plate locking pin 408 can prevent the hanging bearing housing 400 from moving out of first standard 200, but can still allow for free rotation of the plate rod 405 and hanging bearing housing 400 in the rod hole 216 (or other selected rod hole) to establish alignment with spit orientation in the vertical direction. Hanging bearing housing 400 is configured to enable rotation about a substantially horizontal axis of rotation. The horizontal axis of rotation is defined by plate rod 405, and coincides with the axis defined by the selected rod hole. The hanging bearing housing 400 is configured to enable rotation about plate rod 405 that provides a substantially horizontal axis of rotation. Rotation of first standard 200 allows for the hanging bracket housing to align with the spit orientation in the horizontal direction. While not required for the device to function, it is contemplated that the substantially vertical axis of rotation of first standard 200 and the substantially vertical axis of rotation of second standard 801 can be nearly parallel. Additionally, the substantially horizontal axis of rotation of hanging bearing housing 400 and the substantially horizontal axis of rotation of hanging motor housing 300 can be nearly parallel. To the extent that these pairs of axes of rotation are not parallel, the device will self-adjust. If first standard 200 is not exactly vertical, hanging bearing housing 400 can rotate to ensure that hanging bearing housing 400 adjusts to present a level opening to accommodate spit 500.

Spit pointed end 502 and a portion of first rounded section 503 can be inserted through a food item 700 and into hanging bearing housing 400, and secured with a set screw (not shown). Hollow end 504 (not shown) can be inserted through the first bearing mount 340 to engage motor drive shaft 302 (not shown). The motor (not shown) rotates the spit 500. As the device is being assembled, hanging motor housing 300, the hanging bearing housing 400, and standards 200 and 801 can freely rotate, which can allow the spit 500 to intersect both sides of the device without regard to the positioning of the bases 100 and 800 or unevenness of the ground. Food item 700 is positioned over heat source 601.

The configuration of the device provides for easy and convenient assembly with interchangeable parts. Hanging motor housing 300 can be connected to either the first standard 201 or second standard 801. Motor rod first end 316 can be inserted through a rod hole 212, 213, 214, 215, or 216 of first standard 200 or rod hole 812, 813, 814, 815, or 816 of second standard 801. Hanging bearing housing 400 can be connected to either first standard 201 or second standard 801 by inserting plate rod first end 406 into rod hole 212, 213, 214, 215, or 216 of first standard 201 or rod hole 812, 813, 814, 815, or 816 of second standard 801. Similarly first standard 201 can be positioned atop first base 100 or atop second base 800. Second standard 801 can be positioned atop first base 100 or atop second base 800. Each base can accommodate each standard. Each standard can accommodate either the motor rod first end 316 or plate rod first end 406. The rotisserie device can be set up in the most convenient configuration for the user.

Figure 7:
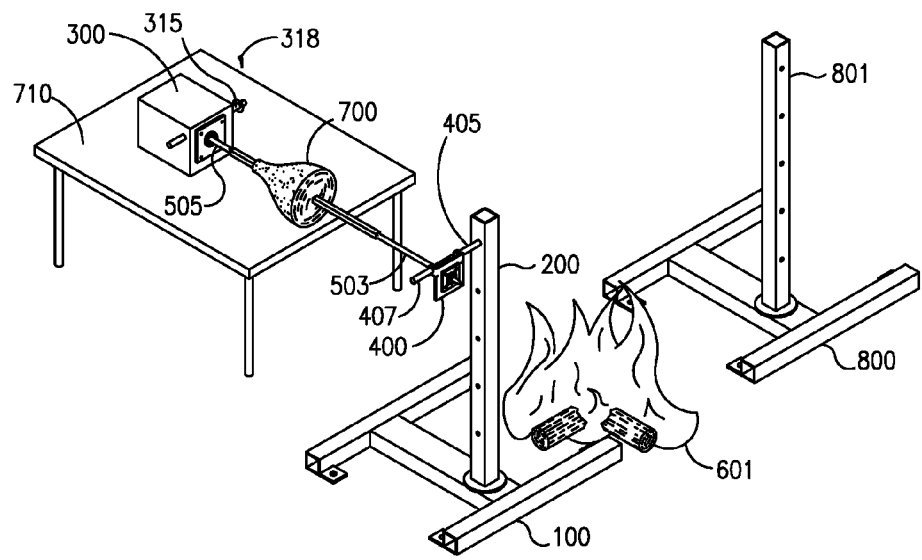
FIG. 7 is a perspective view of a method of utilizing an embodiment of the invention.

FIG. 7 shows an embodiment of a self-adjusting spit device after cooking is completed and a food item 700 is removed from the heat source 601. When the user wants to remove the food item 700 from the heat source 601, either the spit first rounded section 503 or the second rounded section 505 can be removed from its respective standard 200 or 801 while the opposite spit end 505 or 503 remains connected to respective standard 801 or 200.

FIG. 7 illustrates removal of spit second rounded section 505. Hanging motor housing 300 can be detached from second standard 801 by grasping the hanging motor housing 300, removing the motor locking pin 318, and removing the motor rod 315 from second standard 801. In this way, a user can merely move the hanging motor housing 300 and that end of the spit 505 in a generally horizontal direction towards a table surface 710 or other destination. The fact that the opposite standard, first standard 200 rotates about base 100 allows for freedom of movement in the horizontal direction. The hanging bracket housing 400 can be rotated about the substantially horizontal axis of plate rod 405 and that allows for freedom of movement in the vertical direction. It should be understood as a matter of geometry that any rotational movement will trace out an arc or a circle over long movements, but small movements of spit second rounded section 505 will be substantially vertical as it is rotated about the substantially horizontal axis of plate rod 405. Thus, while the distance from the other standard is fixed by the spit length, the user is free to move about the radius of the opposite standard to achieve a variety of locations for moving the food item 700 that has been cooked on the spit 500.

A complimentary method can be utilized that will be understood to be similar to the method pictured. This method is not illustrated, but contemplates removal of hanging bearing housing 400 from first standard 200. Spit first rounded section 503 can be rotated about second standard 801 by removing the plate locking pin (not shown) and removing the plate rod 405 from first standard 200. The user can grasp either the hanging bearing housing 400 or spit pointed end 502 (not shown) and walk around second standard 801. The food item 700 can be placed on table surface 710 and served. This procedure allows a single person to remove a large, heavy food item 700 from the heat source 601 without additional assistance. As described herein, hanging motor housing 300 can be connected to first standard 200 or second standard 801. Hanging bearing housing 400 can be connected to the opposite standard, either second standard 801 or first standard 200. First standard 200 can be placed upon first base 100 or second base 800. Second standard 801 can be placed upon the other available base, either second base 800 or first base 100. Similarly the invention can be assembled by placing food on the spit as in FIG. 7 and then assembling the device as in FIG. 6.

The benefits of the invention are provided by the combination of the foregoing features that provide increased flexibility and adaptability over the prior art. The first and second base provide leveling features including adjustable feet that can be rotatably adjusted to level each base. First standard and second standard are each positioned on a post that allows the standard to rotate through 360 degrees on a substantially vertical axis. Each standard contains several rod holes positioned at various heights. The selection of an appropriate rod height allows the user to position a second base at a different elevation and still provide means for a spit to be substantially level. The use of a hanging bearing housing that itself is rotationally connected to a standard allows the bearing in the bearing mount to receive a spit at various angles. The use of a second bearing mount rotatable about a rod increases this functionality. The features of the invention combine to provide increased flexibility to various placements near and around a heat source. Further, the invention provides increased ease of use as a food item can be attached to a spit or removed from a spit while the spit is attached to hanging motor housing, but away from a heat source. Utilizing the attachment to a first standard by way of a hanging motor housing supports one end of the spit. The rotational span of the spit about the first standard allows a user to walk one end of the spit around with the other end supported by the invention allowing one person to remove the food item from a heat source quickly and conveniently.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A rotisserie device comprising:
a first base;
a first standard connected to said first base;
a hanging bearing housing comprising a plate bearing containing at least one ball bearing, and removably connected to said first standard by a plate rod inserted into a first rod hole extending through said first standard;
a second base;
a second standard connected to said second base; and
a hanging motor housing comprising a motor bearing containing at least one ball bearing, and removably connected to said second standard by a motor rod inserted into a second rod hole extending through said second standard;
wherein said first standard is configured to enable rotation about a first vertical axis, said second standard is configured to enable rotation about a second vertical axis, said hanging bearing housing is configured to enable rotation about a first horizontal axis defined by said first rod hole extending through said first standard, and said hanging motor housing is configured to enable rotation about a second horizontal axis defined by said second rod hole extending through said second standard, the device providing rotation about four separate axes.

2. The rotisserie device of claim 1 wherein:
said first base further comprises a first post that defines said first vertical axis, said first standard is rotatably mounted on said first post by a first post hole in said first standard;
said second base further comprises a second post that defines said second vertical axis, said second standard is rotatably mounted on said second post by a second post hole in said second standard;
said hanging motor housing further comprises a motor rod collar, a motor rod hole, and a removable motor locking pin for securing said hanging motor housing to said second standard; and
said hanging bearing housing further comprises a plate rod collar, a plate rod hole, and a removable plate locking pin for securing said hanging bearing housing to said first standard.

3. The rotisserie device of claim 2 wherein:
said hanging motor housing further comprises a motor, a motor drive shaft, a motor bearing mount, said at least one ball bearing is sealed within said motor bearing having a motor bearing opening, and a set screw that can be tightened towards said motor bearing opening to contact a spit;
said motor drive shaft is oriented towards said motor bearing opening and engages a second rounded section of said spit;
said spit is held within said motor bearing opening by tightening said set screw to contact said spit and join rotational movement of said motor bearing and said spit;
said hanging bearing housing further comprises a hanging plate; and
said hanging plate comprises a plate spit hole, a plate bearing mount, said at least one ball bearing is sealed within said plate bearing having an opening to receive a first rounded section of said spit, and a second set screw to join rotational movement of said spit and said plate bearing.

4. The rotisserie device of claim 3 wherein:
said spit further comprises a pointed end configured for piercing a food item and intersecting said plate bearing, and a hollow end comprising a spit key joined to said motor drive shaft comprising a recessed key.

5. The rotisserie device of claim 4 wherein:
said first standard further comprises a shaft, a bottom, and said first rod hole passes through said shaft substantially horizontally;
said second standard further comprises a shaft, a bottom, and said second rod hole passes through said shaft substantially horizontally;
said first base further comprises a first leg, a second leg, a cross beam, and said first post is cylindrical; and
said second base comprises a first leg, a second leg, a cross beam, and said second post is cylindrical.

6. The rotisserie device of claim 5 wherein:
said hanging motor housing comprises a first side, a second side, and a front side;
said motor rod is fixedly attached to said first side and said second side; and
said front side comprises a motor spit hole, and said motor is positioned with said motor drive shaft centered and accessible through said motor spit hole.

7. The rotisserie device of claim 6 wherein said hanging motor housing front side is connected to said motor bearing.

8. The rotisserie device of claim 5 wherein said first post is positioned off-center.

9. The rotisserie device of claim 2 wherein:
said first base further comprises one or more threaded openings and one or more feet to threadedly engage said threaded openings to adjust the elevation of said first base.

* * * * *